US012587467B2

(12) United States Patent
Kasiviswanathan et al.

(10) Patent No.: US 12,587,467 B2
(45) Date of Patent: Mar. 24, 2026

(54) SYSTEM AND METHOD FOR PATH COMPUTATION SERVICE FOR A SERVICE AWARE VIRTUAL TOPOLOGY OVER A WIDE AREA NETWORK

(71) Applicant: Arista Networks, Inc., Santa Clara, CA (US)

(72) Inventors: Venkitraman Kasiviswanathan, San Ramon, CA (US); Yunxia Chen, Rollingwood, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 20 days.

(21) Appl. No.: 18/525,696

(22) Filed: Nov. 30, 2023

(65) Prior Publication Data

US 2025/0184258 A1 Jun. 5, 2025

(51) Int. Cl.
| | |
|---|---|
| *H04L 45/12* | (2022.01) |
| *H04L 12/28* | (2006.01) |
| *H04L 45/00* | (2022.01) |
| *H04L 47/10* | (2022.01) |

(52) U.S. Cl.
CPC ........ *H04L 45/123* (2013.01); *H04L 12/2854* (2013.01); *H04L 45/54* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 11,245,614 B1 * | 2/2022 | Backes | ................. | H04L 45/76 |
| 2011/0267954 A1 * | 11/2011 | Seetharaman | .......... | H04L 47/20 |
| | | | | 370/241 |
| 2012/0005371 A1 * | 1/2012 | Ravindran | ............. | H04L 45/64 |
| | | | | 709/242 |
| 2018/0069780 A1 * | 3/2018 | Dhanabalan | ........ | H04L 41/0896 |
| 2019/0190814 A1 * | 6/2019 | Tseng | ................... | H04L 45/021 |

(Continued)

FOREIGN PATENT DOCUMENTS

| | | | | |
|---|---|---|---|---|
| CA | 2397300 A1 * | 7/2001 | ............. | H04L 47/70 |
| WO | WO-2023014722 A1 * | 2/2023 | ........... | H04L 45/586 |

OTHER PUBLICATIONS

European Search Report for European Patent Application No. 24208345.9, dated Mar. 18, 2025, 14 pgs.

*Primary Examiner* — Phyllis A Book

(74) *Attorney, Agent, or Firm* — Sprinkle IP Law Group

(57) ABSTRACT

Systems and methods for generating routing tables and providing these tables to routers in a network for use in routing data to various destination routers. One embodiment comprises an apparatus that includes a centralized controller for a network. The centralized controller is adapted to receive link metrics for a plurality of links between routers in a WAN. For each pair of routers, the centralized controller determines the paths between the router pair, determines suitability metrics for each path, wherein each metric is specific to a corresponding data type, and selects, for each data type, a corresponding subset of the paths between the router pair based at least in part on the suitability metrics for the data type. The centralized controller then transmits, to each of the routers in the WAN, the selected subsets of the paths for the corresponding router.

17 Claims, 11 Drawing Sheets

(56)         References Cited

U.S. PATENT DOCUMENTS

| | | | |
|---|---|---|---|
| 2022/0006726 A1* | 1/2022 | Michael | H04L 45/745 |
| 2022/0272029 A1* | 8/2022 | Vasseur | H04L 45/302 |
| 2022/0278922 A1* | 9/2022 | Kolar | H04L 43/0894 |
| 2022/0294738 A1* | 9/2022 | Vasseur | H04L 47/28 |
| 2022/0376998 A1* | 11/2022 | Vasseur | H04L 41/5067 |
| 2023/0038643 A1 | 2/2023 | Narayan | |
| 2023/0062080 A1* | 3/2023 | Sidebottom | H04L 45/02 |
| 2023/0105873 A1 | 4/2023 | Narayan | |
| 2023/0171190 A1* | 6/2023 | Vasseur | H04L 45/70 |
| | | | 370/389 |
| 2023/0336464 A1* | 10/2023 | Mermoud | H04L 45/125 |
| 2023/0370363 A1* | 11/2023 | Padi | H04L 45/125 |
| 2023/0412488 A1* | 12/2023 | Kumar Mishra | H04L 45/02 |
| 2024/0007387 A1* | 1/2024 | Mermoud | H04L 43/50 |
| 2024/0007389 A1* | 1/2024 | Mermoud | H04L 45/123 |
| 2024/0007392 A1* | 1/2024 | Vasseur | H04L 45/123 |

* cited by examiner

SYSTEM AND METHOD FOR PATH COMPUTATION SERVICE FOR A SERVICE AWARE VIRTUAL TOPOLOGY OVER A WIDE AREA NETWORK

TECHNICAL FIELD

The disclosed embodiments relate generally to network devices and more particularly to systems and methods for generating routing tables and providing these tables to routers in a network for use in routing data to various destination routers.

BACKGROUND

In a wide area networks (WANs), routers are interconnected over different types of underlay networks (the physical network infrastructure that enables network traffic to be forwarded from one point to another). The underlay networks may be provided by various service providers (SPs). Data traffic may be sent from one network device to another, potentially across multiple underlay networks, through one or more virtual tunnels that allow the data to be securely transmitted between the network devices. The network devices and the tunnels interconnecting them form a virtual fabric.

When traffic is sent from a first router in the WAN to a second router in the WAN, there may be multiple redundant paths that the traffic may traverse between the routers. In order to send a packet from the first router to the second router, the first router must program the path into the header of the packet. The first router determines this path from a list received from a centralized controller for the WAN. Conventionally, the centralized controller determines a single, "best" route (based on a given metric) for packets to be sent between any pair of routers in the WAN and sends this list to each of the routers in the WAN. Then, when the first router needs to send data to the second router, it simply retrieves the corresponding best path from the path list.

This conventional method has a number of problems, however. For instance, since the first router sends all data traffic to the second router over the same path, it does not take advantage of the multiple, redundant pathways through the network fabric. The "best" path identified by the conventional centralized controller may therefore become overloaded with traffic that could have been sent via a different path. Additionally, if there is a failure along this path, some of the data sent by the first router may be lost. Another problem with the conventional centralized controller is that the identified "best" path may be optimal for one type of data, but may be sub-optimal for other types of data.

The disclosed embodiments provide solutions to these and other problems that arise in existing systems.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
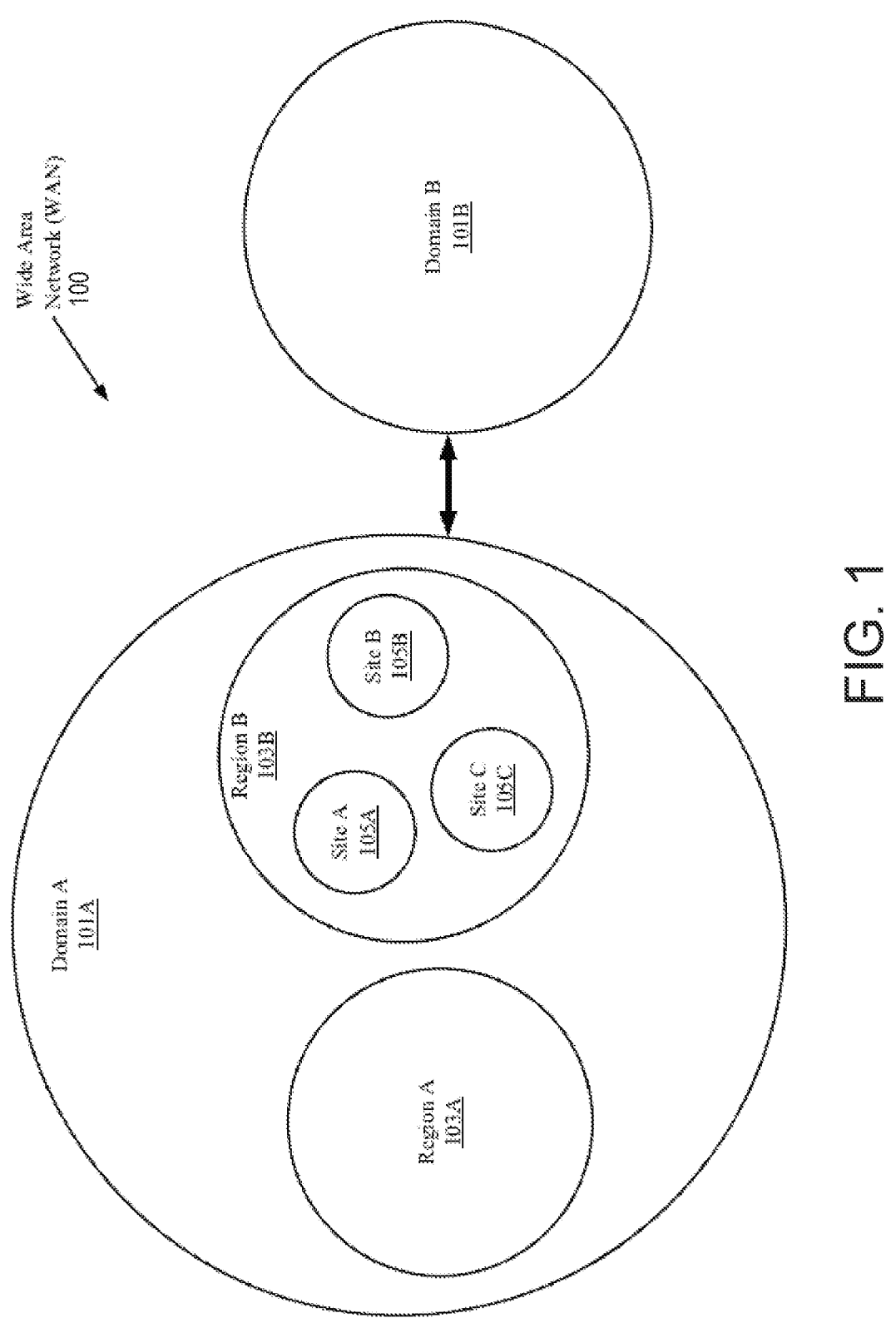
FIG. 1 shows an example of a wide area network (WAN) in accordance with one or more embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

To simplify managing network policies, networks are hierarchically divided into different levels (e.g., domains, regions, sites, and network devices). The network devices are interconnected such that one network device may be connected to another network device using multiple paths, including single virtual-hop paths (representing a connection using a virtual tunnel link between two network devices) and multiple virtual-hop paths (representing a combination of two or more single-virtual hop paths).

The direct (i.e., single virtual-hop) paths are discovered automatically by the network devices through exchanging their SP connectivity information (referred to herein as "reachability information") using border gateway protocol (BGP) techniques. Using this technique, the network devices discover only the direct paths between one another, but this does not give the devices an awareness of all possible paths (e.g., multiple hop paths) via other network devices within the network.

Even if these multiple-hop paths were to be discovered by the network devices through this process, the network devices still would not be able to determine which paths were best-suited to transmit data traffic, particularly when considering that specific applications, such as voice services, video services, large data transfers, secure data transfers, etc. (which may also be referred to as "application classification"), may have different characteristics and requirements, so a path that is well-suited for transmitting data for one application may not be well-suited for transmitting data of a different application.

Embodiments disclosed herein make use of the redundant paths between routers by providing each router with a list that includes multiple paths to each of the other routers in the WAN. For a given pair of routers, the centralized controller (e.g., a network controller) may identify multiple alternative paths for each type of data to be transmitted between routers.

By identifying multiple paths that can be used to transmit data to each of the other routers, the disclosed embodiments are more efficient in their use of the available links between the routers and maintain diversity of paths. This provides a number of advantages over existing systems and methods. For example, each router has multiple paths from which to choose, where different paths may be better suited to transmit data for different applications. Different applications may also specify selective constraints on what type of node, link, networks, and service-providers may be included in the paths used to transmit data associated with the application. Additionally, for a given application, multiple paths which potentially cover different neighboring nodes, links, networks, and service-providers, so that the data corresponding to the application can be distributed among the available paths, making better use of the available resources. Further, the failure of any link only affects a small part of the network, and alternative paths are available so that data transmissions are not prevented by the failure.

The paths for each type of data are determined based on metrics for the paths that indicate their suitability for each different application. These metrics may include, for example, latency, jitter, loss, total bandwidth, and current utilizations, etc.

It should be noted that "centralized controller" is used herein to refer to a controller that serves as a single place for receiving the path metrics, processing the metrics and generating the routing tables that will be provided to the routers in the network. The centralized controller itself need not be a single physical device, but may comprise functions that are distributed across multiple devices.

In addition to differentiating between different paths based on their suitability for different applications, disclosed embodiments may include multiple alternative paths for each application. This enables the routers to distribute their traffic loads among multiple paths. By enabling the distribution of the traffic load among multiple paths, the disclosed embodiments make better use of the available network resources. For example, since the traffic may be transmitted over multiple redundant paths, there is more bandwidth available for the traffic. Additionally, this reduces the impact of a failure in a given path, as the failure may not affect alternative paths. The availability of multiple paths also facilitates fast rerouting of packets when a link or router on the original path fails.

In the disclosed embodiments, a centralized controller collects various metrics on the paths between the routers in the WAN. The centralized controller identifies the possible paths between each router pair and uses the collected metrics to compute suitability metrics for each path. More specifically, a set of suitability metrics are computed for each path, where each suitability metric for a given path represents the suitability of the path to transmit data of a corresponding application. After the suitability metrics have been computed for each path, the centralized controller uses the suitability metrics to select the best paths for each application for each different pair of routers.

Thus, for each pair of routers, there is a corresponding set of paths for each different application. These path sets are provided to each of the routers in the WAN in a corresponding AAVT routing table. Then, when a particular router needs to send data for a particular application to a second router, the first router examines the list received from the centralized controller to identify the path sets associated with the router pair (the first router and the second router) and then selects the path set corresponding to the particular application. The centralized controller then selects one or more of the paths in the path set and transmits the data via the selected path(s). In some embodiments, the centralized controller may also provide to the routers a distribution scheme to use with the selected paths (e.g., transmit 40% of the data via path X, 30% via path Y, and 30% via path Z).

In some of the disclosed embodiments, the AAVT routing table may be constructed by one or more network controllers disposed within the network. Each network controller may include a route reflector and a route identifier agent (referred to collectively as "a network controller agent"). In alternative embodiments, the route reflector may be a distinct and separate device. A network device within the network may measure path metrics of paths between itself and other network devices it is directly connected with (i.e., through a single virtual-hop path) and communicates these metrics using in-band techniques.

In some of the disclosed embodiments, the path metrics and reachability information (herein collectively referred to as "path information") are exchanged between the route reflector and all of the network devices in the network using BGP. In alternative embodiments, each region within the network may include a hub network device that aggregates the path information of all network devices within the region into an aggregated path information database, and transmit the aggregated path information database to the route reflector using BGP. This aggregated path information database may also include paths between the hub network device and hub network devices of other regions that are connected to the same SP.

In some of the disclosed embodiments, the route reflector provides the aggregated path information database to the route identifier agent of the network controller. The route identifier agent uses the aggregated path information database to generate an underlay graph representing a path topology of each region (which may include all WAN paths within one or more sites of each region). When multiple regions are interconnected using hub network devices, the route identifier agent uses the aggregated path information database from each hub network device to generate an underlay graph including the path topology across all of the regions. This underlay graph, along with each network device's policy and requirements (discussed below), is used to construct the AAVT routing table for each network device.

In some of the disclosed embodiments, the route identifier agent analyzes the path information to: (i) discover all single and multiple virtual-hop paths for each network device; and (ii) determine a set of most-suitable paths for each application being executed on each of the network devices based on the path information for each of the hops, as well as the network transmission policies set for each network device. Thus, for example, a path with less jitter and latency may be more suitable for data of a voice application, while a path with greater bandwidth may be more suitable for data of an application for large data transfers.

The path metrics for the hops in the paths may be updated periodically (e.g., every five seconds) and sent to the route identifier agent. If the path state changes (i.e., a path between two network devices is taken down), an immediate update may be sent to the route identifier agent. In one or more embodiments, direct paths between network devices (i.e., single virtual-hop paths) through the same SP may not be included in the aggregated path information database. In these embodiments, the route identifier agent would only be relied upon to discover multiple virtual-hop paths between the network devices.

In some of the disclosed embodiments, the route identifier agent may program each network device to install one or more paths included in the underlay graph through transmission of the AAVT routing tables. The paths to be programmed in each network device may depend on the requirements of each network device, such as the types of applications being handled, security policies that have been implemented, the reachability requirements of the device, the available multi-hop metrics support, etc. (collectively referred to herein as "network device information and policies").

Referring to FIG. 1, an example wide area network (WAN) (100) in accordance with one or more embodiments is shown. The WAN (100) may be a telecommunications network that extends over a large geographic area for implementing computer networking features. As shown in FIG. 1, the WAN (100) may be divided into a hierarchy including, but not limited to, domains (101A, 101B), regions (103A, 103B), and sites (105A-105C). As one example, each domain (101A, 101B) may cover a continent (e.g., North America, Europe, etc.), each region (103A, 103B) may cover some or more states, cities, and/or provinces within the domain (101A, 101B), and each site may represent a physical location (and or virtual instance thereof) (e.g., a building such as an office, school, hospital, etc.) within a region (103A, 103B).

Although the WAN (100) of FIG. 1 is shown as having only two domains (101A, 101B), two regions (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion (e.g., half) of a continent, rather than a full area of the continent.

In some of the disclosed embodiments, each domain (101A, 101B), region (103A, 103B), and site (105A-105C) of the WAN (100) may include network devices (discussed in more detail below) that are able to communicate (e.g., transfer information in the form of network traffic such as data packets) with one another using one or more service providers (e.g., 119A, 119N). As an example, each site (105A-105C) may include one or more branch network devices (e.g., 111A, 111N, FIG. 2). Each region (103A, 103B) may include at least one hub network device (e.g., 113A-113N, FIG. 2) as a relay point for the branch network devices of that region to communicate with network devices in other regions (including regions of other domains). The hub network device may also be located at one of the sites (105A-105C) along with one or more of the branch network devices. Additionally, each domain (101A, 101B) may have a network controller (e.g., 115, FIG. 2) in charge of controlling and/or monitoring the network devices within that domain.

Figure 2:
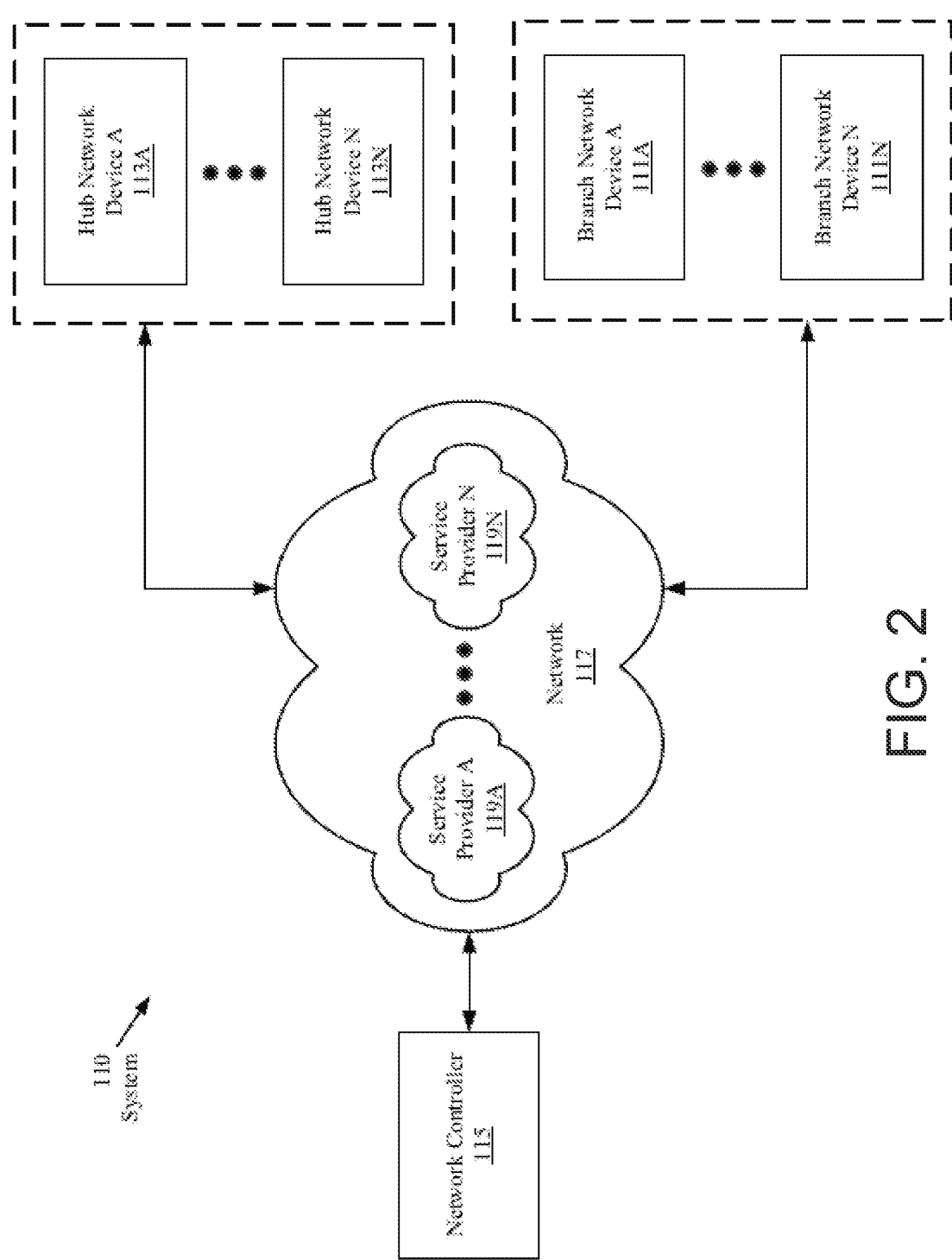
FIG. 2 shows a system in accordance with one or more embodiments.

FIG. 2 shows a system (110) in accordance with one or more embodiments of the disclosure. As discussed above, the system (110) may include components that are physically located within each hierarchical level of the WAN (100). In particular, the system (110) includes one or more branch network devices (111A, 111N), one or more hub network devices (113A, 113N), and a network controller (115) that are connected through a network (117) composed of one or more service providers (119A, 119N). Each of these components is described below.

In some of the disclosed embodiments, the one or more branch network device(s) (111A, 111N) are physical devices that include persistent storage, memory (e.g., random access memory), one or more processor(s) (including a switch chip), and two or more physical ports. Examples of the branch network devices (111A, 111N) include, but are not limited to, a router, a switch, a top of rack (TOR) switch, and a multilayer switch that are connected to one or more client devices (not shown) (e.g., computers, laptops, smartphones, tablets, etc.). As discussed above, in the context of the WAN (100) in FIG. 1, each site (105A-105C) of the WAN (100) may include one or more of the branch network devices (111A, 111N). The branch network devices (111A, 111N) are not limited to the aforementioned specific examples.

The switch chip is hardware that determines which egress port on a branch network device (111A, 111N) to forward packets (which may be in the form of media access control (MAC) frames). The switch chip may include egress and ingress ports that may connect to ports on the branch network device (111A, 111N). Each port may or may not be connected to another device (e.g., a server, a switch, a router, etc.). The branch network device (111A, 111N) may be configured to receive the packets via the ports.

Additionally, the persistent storage in the branch network devices (111A, 111N) may include any type of non-transitory computer readable medium that stores data. For example, the data in the persistent storage may be instructions, which, when executed by one or more processor(s) in the branch network device (111A, 111N), enable the branch network device (111A, 111N) to perform one or more functions of the branch network device (111A, 111N).

In some of the disclosed embodiments, similar to the branch network devices (111A, 111N), the one or more hub network devices (113A, 113N) are physical devices that include persistent storage, memory (e.g., random access memory), one or more processor(s), and two or more physical ports. Examples of the hub network devices (113A, 113N) include, but are not limited to, a hub router that connects and manages one or more branch network devices (111A, 111N). For example, a hub network device (113A, 113N) may be configured as a network hub that broadcasts data to every branch network device (111A, 111N) that is connected to the hub network device (113A, 113N). As discussed above, in the context of the WAN (100) in FIG. 1, each region (103A, 103B) may include at least one hub network device (113A, 113N) that is connected to each of the branch network devices (111A, 111N) at the sites (105A-105C) within the region (103A, 103B). For example, for region B (103B) with multiple sites (105A-105C), the hub network device (113A, 113N) may be located at one of the sites (105A-105C) within region B (103B). The at least one hub network device (113A, 113N) is configured as the point of communication for that region with network devices disposed in other regions of the enterprise network. The hub network devices (113A, 113N) are not limited to the aforementioned specific examples.

Figure 12:
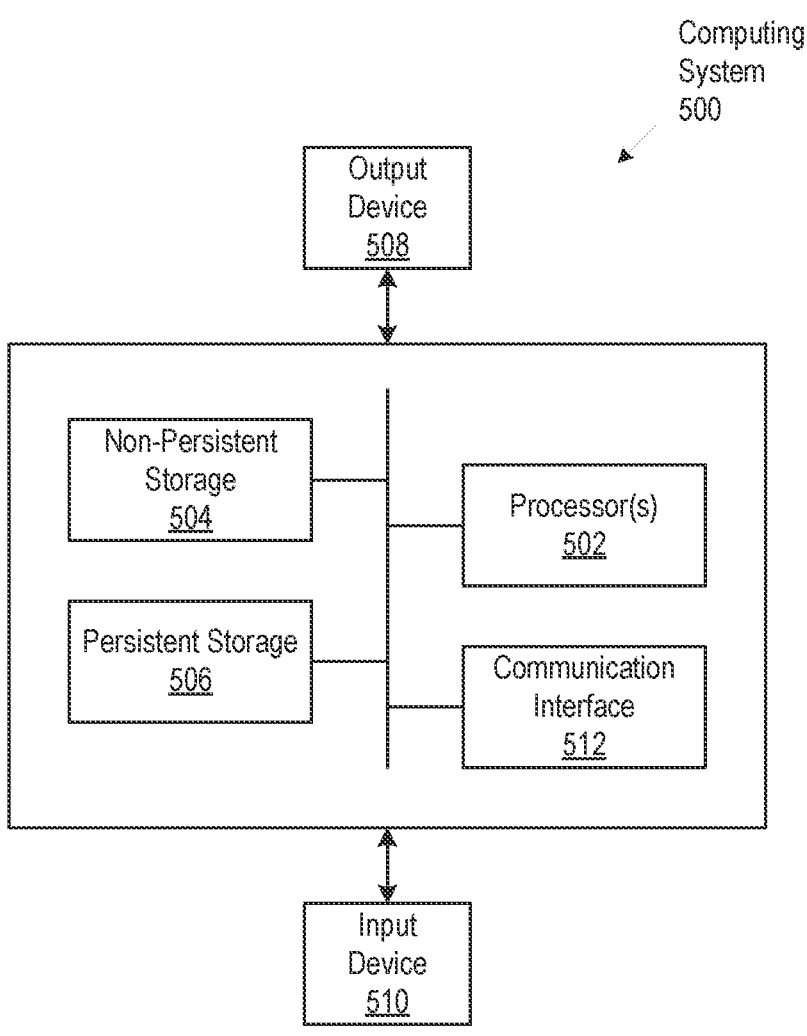
FIG. 12 shows a diagram of a computing device in accordance with one or more of the disclosed embodiments.

In one or more of the disclosed embodiments, the network controller (115) is a physical or virtual device that may be used for performing various embodiments of the disclosure. The physical device may correspond to a physical system (e.g., the computing system of FIG. 12) with functionality to implement the various embodiments of the disclosure. For example, the physical device may be a server (i.e., a device with at least one or more processor(s), memory, and an operating system) that is connected (e.g., directly connected or indirectly connected) via the network connected to the hub network devices (113A, 113N) and the branch network devices (111A, 111N) (through the hub network devices (113A, 113N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In other embodiments, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

As discussed above, in the context of the WAN (100) in FIG. 1, each domain (101A, 101B) may include a single network controller (115). However, one or more embodiments disclosed herein is not limited to this configuration. For example, each domain (101A, 101B) may include multiple ones of the network controller (115) and each region (103A, 103B) with multiple sites (105A-105C) may also include one or more of the network controller (115). In general, the WAN (100) may include any number of network controllers (115) at any hierarchical level of the WAN (100) without departing from the scope of one or more embodiments disclosed herein as long as each network controller (115) is configured to control and/or monitor a group of network devices (e.g., the hub network devices (113A, 113N) and the branch network devices (111A, 111N).

Additional details of the network controller (115) are discussed below in reference to FIG. 3.

In one or more of the disclosed embodiments, the network (117) may be the medium through which the branch network devices (111A, 111N), the hub network devices (113A, 113N), and the network controller (115) are connected within the WAN (100). In one embodiment of the disclosure, the network may include other network devices (or systems) (not shown) that facilitate communication between the aforementioned components. As such, in one embodiment of the disclosure, the network may include any combination of local (e.g., local area network (LAN) and/or WAN segments that may be wire-based and/or wireless and that may use any combination of wired and/or wireless communication protocols.

In one or more of the disclosed embodiments, the network (117) may include one or more service providers (119A, 119N) that provide the branch network devices (111A, 111N), the hub network devices (113A, 113N), and the network controller (115) access to the network (117). For example, the service providers (119A, 119N) may be private (e.g., multiprotocol label switching (MPLS) providers) or public service providers (e.g., internet service providers, or ISPs). The service providers (119A, 119N) are not limited to the aforementioned specific examples and may also include other types of service providers such as, for example, telecommunication service providers.

Figure 3:
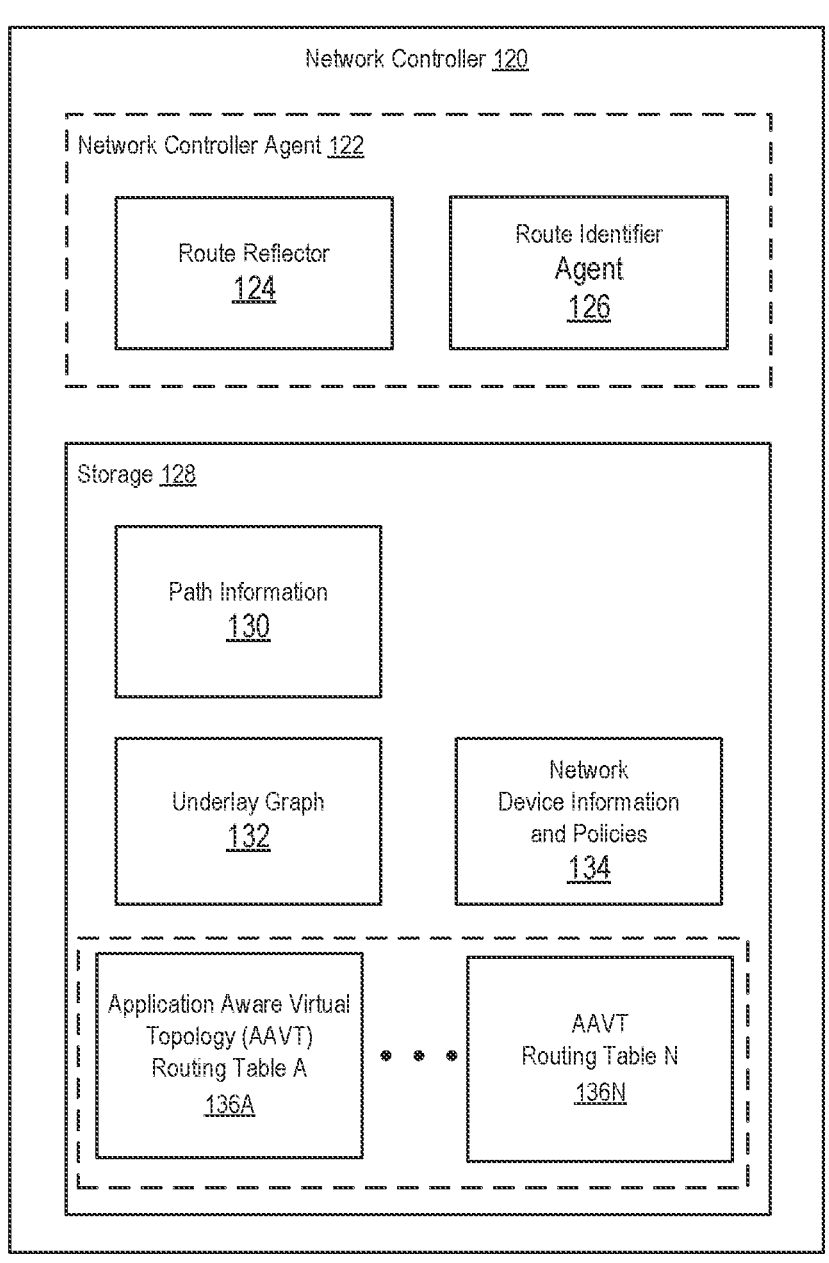
FIG. 3 shows a diagram of a network controller in accordance with one or more embodiments.

FIG. 3 shows an example network controller (120) in accordance with one or more embodiments of the disclosure. The network controller (120) may be the network controller (115) discussed above in reference to FIG. 2. In addition to the components discussed above in reference to FIG. 2, the network controller (120) further includes a route reflector (124), a route identifier agent (126), and a storage (128). The network controller (120) may include additional, fewer, and/or different components without departing from the disclosure. Each of the components illustrated in FIG. 3 is described below.

In one or more of the disclosed embodiments, the route reflector (124) may be configured in hardware (e.g., circuitry), software, or any combination thereof. The route reflector (124) uses border gateway protocol (BGP) techniques to learn about the paths between each device (e.g., the branch network devices (111A, 111N), the hub network devices (113A, 113N), and the controller (115)) within the network (e.g., 117, FIG. 2). For example, each of the devices within the network is configured for BGP and a BGP session is established between each of the devices and the route reflector (124). Although the route reflector (124) is shown as being part of the network controller (120) in FIG. 3, one of ordinary skill in the art would appreciate that one or more embodiments disclosed herein is not limited to such a configuration. For example, the route reflector (124) may be provided externally to the network device (120) as a separate and independent component that is connected, (e.g., directly connected or indirectly connected) to the network controller (120).

In one or more of the disclosed embodiments, the route identifier agent (126) may be configured in hardware (e.g., circuitry), software, or any combination thereof. The route identifier agent (126) interacts with the other components (e.g., the route reflector (124) and storage (128)) of the network controller (120) to facilitate the implementation of one or more protocols, services, and/or features of the network controller (120). For example, the route identifier agent (126) may be used for performing one or more steps of processes in accordance with various embodiments of the disclosure for generating a virtual topology for each of the network devices (e.g., the branch network devices (111A, 111N), the hub network devices (113A, 113N)) on the network.

In one or more of the disclosed embodiments, when the route reflector (124) is included as part of the network controller (120), the combination of the route reflector (124) and the route identifier agent (126) is collectively referred to as the network controller agent (122). In such a configuration, the route reflector (124) and the route identifier agent (126) may be configured in hardware (e.g., circuitry), software, or any combination thereof as a single component within the network controller (120) that performs the functions of both the route reflector (124) and the route identifier agent (126).

In one or more of the disclosed embodiments, the storage (128) is implemented using devices that provide data storage services (e.g., storing data and providing copies of previously stored data). For example, storage (128) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more of the disclosed embodiments, the storage (128) is configured to store at least path information (130), an underlay graph (132), network device information and policies (134), and one or more AAVT routing tables (136A, 136N). Each of these components stored in the storage (128) is described below.

In one or more of the disclosed embodiments, the path information may include reachability information and path metrics. The path information (130) may be stored in the form of a data structure (e.g., a list, table, etc.). In one or more embodiments, the reachability information may include the paths between each of the network devices of the network discovered through BGP using the route reflector (124). Each of these paths making up the reachability information may be single virtual-hop paths. In the context of this disclosure, a single virtual-hop path constitutes a direct connection (through a service provider of the network) between a first network device to second network device without the need of going through a third network device. Said another way, using a single virtual-hop path, the first network device may send network traffic directly to the second network device without having to route the network traffic through the third network device.

In one or more of the disclosed embodiments, the path metrics of the path information may include information specifying one or more properties of the path that reflects a quality of the path. For example, the path metrics may include, but are not limited to: latency, jitter, loss, total bandwidth, and current utilizations, etc. In one or more embodiments, the path metrics of each path in the network may be obtained using in-band (e.g., measured properties of a path are piggy backed on existing network traffic) and out-of-band techniques (e.g., synthetic probes with difference quality of service (QOS) marking for measuring latency, jitter, loss, etc.) and transmitted to the network controller using BGP.

In one or more of the disclosed embodiments, the underlay graph (132) stored in the storage (128) may specify a path topology between the network devices (e.g., the branch network devices (111A, 111N), the hub network devices (113A, 113N), and the network controller (115)) connected on the network. The underlay graph (132) may be stored in the form of a pictorial graph and/or a data structure (e.g., a list, table, etc.). The path topology in the underlay graph (132) shows all of the connections between each of the network devices connected on the network, and further specifies the service provider that provides the connections. This allows multiple virtual-hop paths (i.e., paths made up of multiple single virtual-hop paths) to be discovered within the underlay graph (132).

As an example, assume that a hub network device is connected to two branch network devices (branch A and branch B). The hub network device is connected to branch B through the Internet, the hub network device is further connected to both branch A and branch B through MPLS, and branch A is connected to branch B through MPLS. A pictorial representation of this example connection is shown in the implementation example discussed below in reference to FIG. 8. The underlay graph (132) for these three network devices may be a pictorial graph showing the three network devices with a line from the hub network device to branch B to show the Internet connection and another line from branch A to branch B showing the MPLS connection. A line also extends from the hub network device to each of branch A and branch B showing the MPLS connection. Such an underlay graph (132) shows that branch A may communicate with the hub network device using a single virtual-hop path through the MPLS connection or through a multiple virtual-hop path (using a combination of the MPLS and the Internet) by going through branch B. Although a specific example of the underlay graph (132) is provided above, one of ordinary skill in the art would appreciate that other variations (e.g., ones that use different line styles and line colors, ones illustrated in table format, etc.) of the underlay graph (132) are possible without departing from the scope of one or more embodiments as long as the underlay graph (132) accurately illustrates all of the connections between all of the network devices connected on the network.

In one or more embodiments, multiple ones of the underlay graph (132) may be stored in the storage (128). For example, assume that a network is an enterprise network divided into domains, regions, and sites. An underlay graph (132) may be generated for each layer of the enterprise network hierarchy.

In one or more of the disclosed embodiments, the network device information and policies (134) stored in the storage (128) may include information specifying a functionality of each of the network devices (e.g., the branch network devices (111A, 111N), the hub network devices (113A, 113N)). For example, network device information and policies (134) may include, but is not limited to, information specifying the applications to be executed by a network device, the network device's security policies (e.g., security policy preventing sensitive data from going over public networks), the network device's reachability requirements (e.g., information specifying how the network device restricts or limits communication with other network devices), whether the network device supports multiple virtual-hop (i.e., the network device's multiple virtual-hop metrics support), etc. In one or more embodiments, the network device information and policies (134) may be stored in the form of a data structure (e.g., a list, table, etc.).

In one or more of the disclosed embodiments, the AAVT routing table(s) (136A, 136N) stored in the storage (128) may include information (e.g., in the form of a routing table) specifying all possible paths between a network device among the network devices (e.g., the branch network devices (111A, 111N), the hub network devices (113A, 113N)) to another one of the network devices. In one or more embodiments, a path in the AAVT routing table (136A, 136N) may include the set of network devices and individual links (e.g., the specific ingress/egress port of a network device) connecting the network devices. In one or more embodiments, the path may comprise an ordered set of local links on each network device that the path traverses.

In one or more embodiments, the AAVT routing table(s) (136A, 136N) may also include usability information specifying which of the paths between a network device and another network device is best-suited for a particular application and/or policy (e.g., based on the network device information and policies (134) of the network device) to be executed by the network device. This advantageously prioritizes the constraints of each path between the network devices to leverage all of the service provider connections for delivering the best application performance at the lowest cost.

In one or more embodiments, an AAVT routing table (136A, 136N) is generated (e.g., by the route identifier agent) for each of the network devices connected on the network. The AAVT routing tables (136A, 136N) may be stored in the form of a data structure (e.g., a list, table, etc.).

Although the specific example of FIG. 3 is described as using BGP, one of ordinary skill in the art would appreciate that other network techniques that are able to retrieve information equivalent to the path information (130) may be utilized without departing from the scope of one or more embodiments described herein.

Furthermore, one skilled in the art will recognize that the architecture of the system (100), of the network controller (120), and of the network (117) is not limited to the components shown in FIGS. 2 and 3. For example, the network may include any number and any type of network devices participating in the sharing of data. Further, the network controller (120) may include components (e.g., a processor) not shown in FIG. 3.

Figure 4:
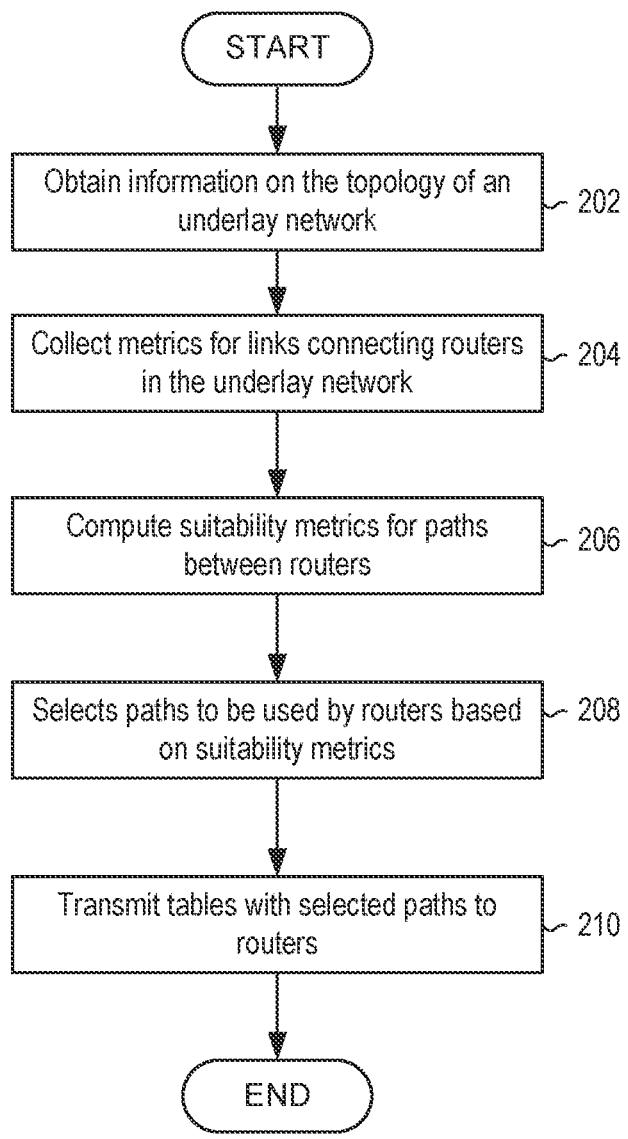
FIG. 4 shows a flowchart of a method for configuring routers within a WAN to transmit data to other routers in the WAN using one or more paths that have been determined to be the most suitable for particular applications in accordance with one or more embodiments.

FIG. 4 shows a flowchart of a method in accordance with one or more embodiments of the disclosure. The depicted method configures routers within a WAN to transmit data to other routers in the WAN using one or more paths that have been determined to be the most suitable for particular applications. While this method and other methods disclosed herein are illustrated by a particular series of steps, the steps may be modified, performed in a different order, combined, performed in a parallel and/or partially overlapping manner without departing from the disclosure.

As shown in FIG. 4, a network controller (e.g., 115, FIG. 2; 120, FIG. 3) obtains information from the devices in a WAN and generates an underlay graph that represents the topography of the WAN (step 202). Then, in step 204, the network controller collects link metrics that represent the characteristics of each link between the routers in the WAN. The link metrics may include various different characteristics, but some of the characteristics that are typically relevant are: latency for the packets to traverse the link; jitter seen on the link; loss rate seen on the link; bandwidth; and MTU (Max Transmission Unit) on the link.

The metrics (i.e., latency, jitter, loss-rate, etc.) can be measured using a number of methods which may include, for example, proprietary methods or IETF specified protocols like TWAMP (https://datatracker.ietf.org/doc/html/rfc5357). This information could also be obtained by periodically using a regular "ping" utility. For metrics such as MTU or bandwidth, probe packets could be sent on a periodic basis to discover the metric values.

In step 206, based on the link metrics, the network controller computes path metrics for each of the paths that may be used by each router to send data to each of the other routers in the WAN. The path metric for a given path is computed using the link metrics for each of the links that are included in the path. Additionally, the path metrics are computed for multiple, different applications using algorithms that determine the suitability of the path for transmitting data specific to the corresponding applications.

Path metrics may be determined by aggregating the individual link metrics. For example:

latency of path=sum of latency of individual links in the path jitter of path=sum of jitter of individual links in the path loss rate=loss rate applied recursively (e.g., if x1 and x2 are the loss rates of the two links that comprise a path, then the total loss rate for the path is $1-(1-x1)*(1-x2)$)

The algorithm for determining path metrics does not require one scalar number to be derived from the individual metrics, but may consider all the different metric values between the corresponding nodes.

In step 208, the network controller selects, for each router, a corresponding set of paths to be used by the router to transmit data to each of the other routers in the WAN. For each of the destination routers to which data may be transmitted, the network controller selects one or more paths for each different application. Thus, for a given source router, a set of possible destination routers is identified. For each of these possible destination routers, the paths are selected that are most suitable for multiple different applications. For each of the applications, the network controller may select multiple alternative paths from the source router to the destination router. For each of the applications, the network controller selects the one or more paths based on the computed path metrics for the corresponding application. The network controller may additionally determine a distribution of traffic between the selected paths for a given application.

In step 210 of FIG. 4, the network controller transmits to each of the routers in the WAN a corresponding AAVT routing table that contains the paths selected for the router. As noted above, the paths identified in the AAVT routing table for a given router include, for each possible destination router, a corresponding set of paths for each different application. In some embodiments, the AAVT routing table includes a specific traffic distribution among the paths which is to be used by the router. For instance, if there are two selected paths for a particular destination router and application, the distribution may indicate that the 60% of the traffic should be transmitted via the first path and 40% of the traffic should be transmitted via the second path.

After a given router receives the corresponding AAVT router table from the network controller, it uses the paths identified in the table to determine which path(s) to use when transmitting data for a particular application to a particular destination. For example, when the router (router X) needs to transmit data for application N to router Y, router X looks up destination router Y in the AAVT routing table (or in a memory programmed according to the AAVT routing table), then router X looks up application N under destination router Y. Listed under router Y and application N are one or more paths that have been determined to be the most suitable for transmitting this type of traffic to router Y. If there is a specified distribution associated with the identified path(s), router transmits its traffic over the identified path(s) using the specified distribution. If no distribution is specified, router X makes its own determination as to how the traffic is distributed (e.g., the traffic may be evenly distributed among the paths, or all of the traffic may be transmitted via a single path).

As noted above, transmitting the data traffic over multiple redundant paths from router X to router Y may make more bandwidth available for the traffic, and may also reduce the impact of a failure in a given path. In the event of a failure of a link over which some of the data traffic is transmitted, data may be successfully transmitted to an intermediate router which cannot then forward the data to a subsequent router in the path (e.g., because of a failed link between them). In this case, the intermediate router may be able to forward the received data to the intended destination router (router Y) by examining its own AAVT routing table and performing the same procedure originally performed by router X. In other words, the intermediate router looks up destination router Y in its AAVT routing table (or corresponding memory), then looks up application N under destination router Y and identifies the paths that have been determined to be the most suitable for transmitting this type of traffic from the intermediate router to router Y. the intermediate router then transmits the received traffic over the identified paths using any distribution specified in its AAVT routing table.

Figure 5:
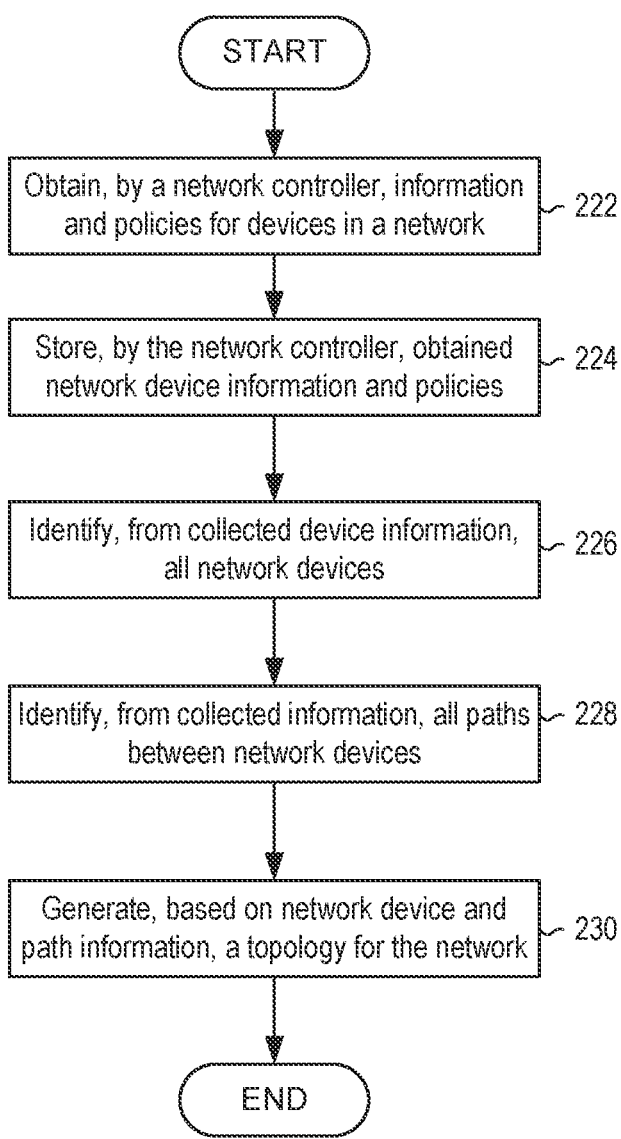
FIG. 5 shows a flowchart illustrating a method in which a network controller obtains network device information to generate an underlay graph in accordance with one or more disclosed embodiments.

Referring to FIG. 5, a flowchart is shown to illustrate a method in which the network controller obtains network device information to generate an underlay graph in accordance with one or more disclosed embodiments. The method depicted in FIG. 5 may be performed to configure a network controller (e.g., 115, FIG. 2; 120, FIG. 3) with the network device information and policies of each network device (e.g., the branch network devices (111A, 111N), the hub network devices (113A, 113N)) connected on the network. The method shown in FIG. 5 may be performed by, for example, the network controller agent (e.g., 122, FIG. 3) of the network controller. Other components of the systems in FIGS. 2-3 may perform all, or a portion, of the method of FIG. 5 without departing from the scope of this disclosure.

In Step 222, the network controller obtains network device information and policies (e.g., 134, FIG. 3) of each network device (e.g., the branch network devices (111A, 111N), the hub network devices (113A, 113N)) connected on the network. In one or more embodiments, the network device information and policies of each branch network device (e.g., 111A-111N, FIG. 2) may first be transmitted to a hub network device (e.g., 113A-113N, FIG. 2) in charge of the branch network devices. The hub network device aggregates all of the received network device information and policies with its own network device information and policies to obtain an aggregated network device information and policies. The aggregated network device information and policies is then transmitted by the hub network device to the network controller. Alternatively, each of the branch network devices may first transmit their respective path information (discovered through, for example, BGP sessions between one another) to the hub network device, which then transmits the information to the network controller.

In Step 224, after obtaining the network device information and policies, the network controller stores the obtained network device information and policies in a storage (e.g., 128, FIG. 3). The network device information and policies obtained by the network controller will subsequently be used during the generation of the AAVT routing tables (e.g., 136A-136N, FIG. 3).

In Step 226, the network controller uses the obtained information to identify all network devices and service providers of the network. In one or more embodiments, all of the branch network devices, the hub network devices, and the service providers connecting the branch network devices and the hub network devices are identified. In Step 228, all paths between the network devices are identified using the collected information (namely, the reachability information included in the path information).

Figure 8:
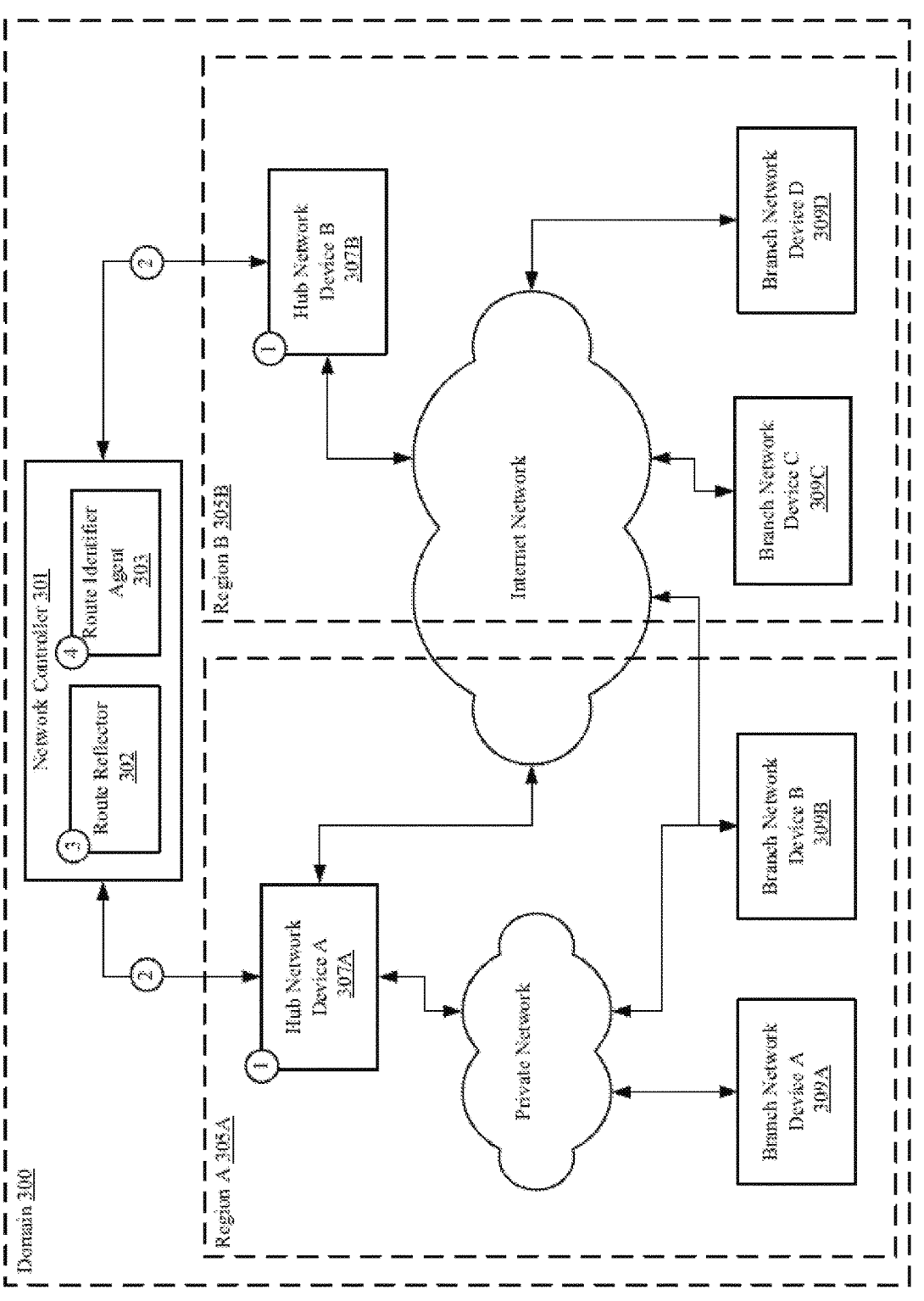
FIGS. 8-9 show an example in accordance with one or more disclosed embodiments.
Figure 9:
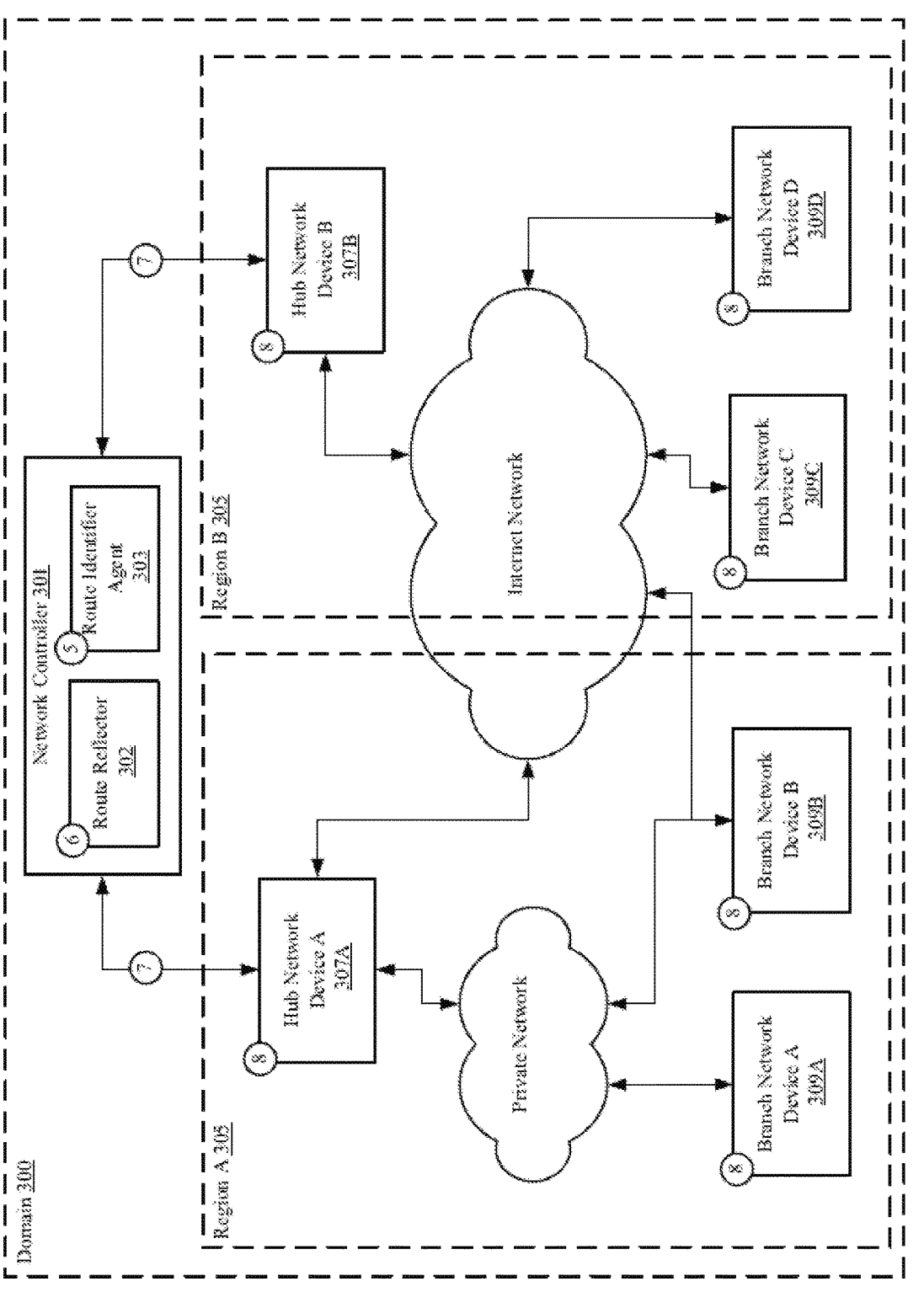

In Step 230, once all of the network devices, service providers, paths, and paths are identified, the network controller uses all of the obtained information to generate a path topology for the network devices connected to the network. In one or more embodiments, the underlay graph is generated using all of the paths (including all single virtual-hop and multiple virtual-hop paths) between each of the network devices connected to the network. Alternatively, in one or more embodiments, the underlay graph may be generated to include only multiple virtual-hop paths between the network devices (i.e., all single virtual-hop paths that do not make up part of a multiple virtual-hop path are excluded from the path topology). Examples of multiple virtual-hop and single virtual-hop paths are shown in FIGS. 8-9.

Figure 6:
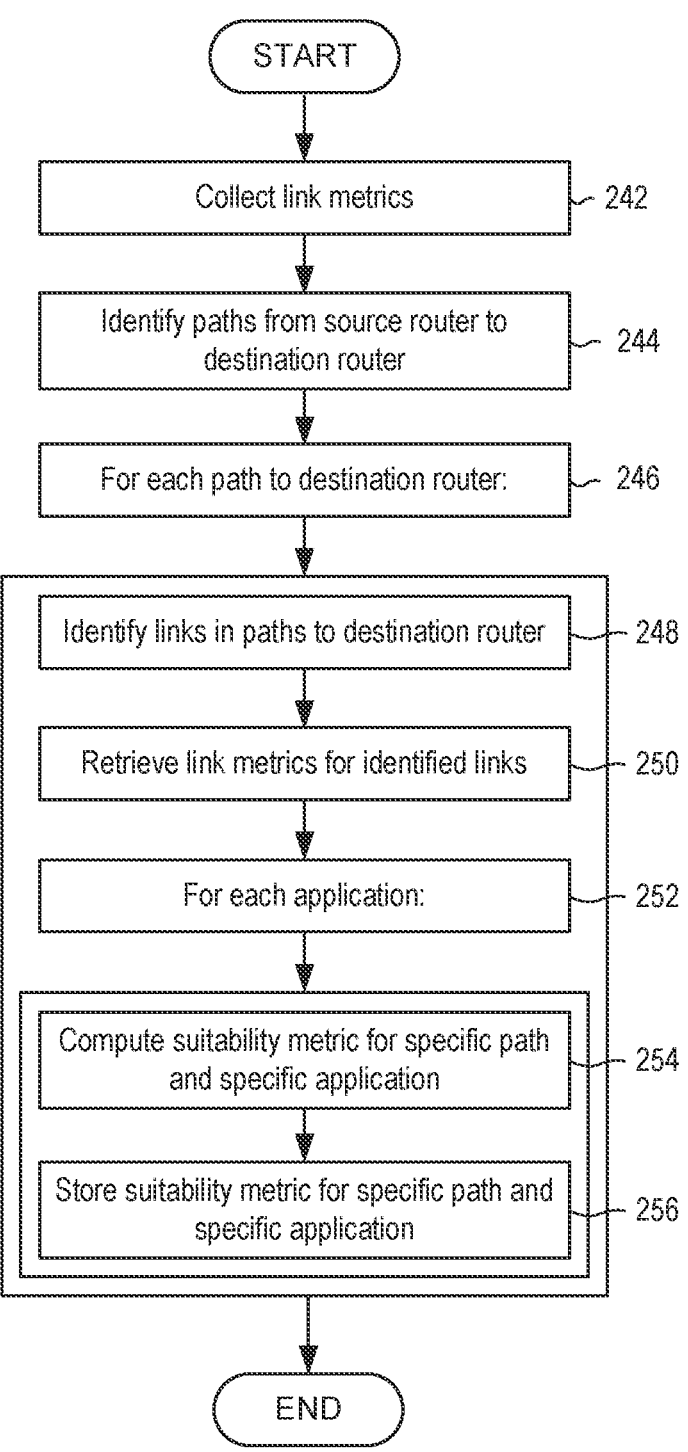
FIG. 6 shows a flowchart illustrating a method in which a network controller computes suitability metrics for different paths by which data may be transmitted from a source router to a destination router in accordance with one or more disclosed embodiments.

Referring to FIG. 6, a flowchart is shown to illustrate a method in which the network controller computes suitability metrics for the different paths by which data may be transmitted from a source router to a destination router. In step 242, the network controller collects link metrics for all of the links in the WAN, subsets of which make up the paths which are used to transmit data from source routers to destination routers. The collection of link metrics is also referred to above in connection with the description of FIG. 4.

In step 244, the network controller identifies paths from the underlay graph that may be used to transmit data from source routers to destination routers. In step 246, the network controller performs, for each of the identified paths, the steps 248-256 to generate and store suitability metrics for each of the paths. The suitability metrics provide indications of the suitability of each path for transmitting data for particular applications. Each suitability metric is path-specific and application-specific.

In step 248, the network controller identifies the set of links that make up the specific path being considered. In step 250, the network controller then retrieves the link metrics for the identified links. In step 252, the network controller computes, for each application for which the path may be used to transmit data, a corresponding suitability metric (step 254). The algorithm that is used to compute the suitability metric may involve any appropriate function of any of the available link metrics, and may vary from one embodiment to another. The suitability metric for each different application may be computed using a unique algorithm, although this is not necessarily the case. In some instances, two or more different applications may use a common algorithm for computing the corresponding suitability metric. Similarly, the suitability metric for each different application may be computed using a different set of link metrics, although this is not necessarily the case.

In step 256, the suitability metric for a specific application and specific path is stored by the network controller. As noted above, the portion of the method including steps 248-256 is repeated for each application for which the path may be used, so that the path may have multiple associated suitability metrics, each of which corresponds to a different application. Likewise, the method including steps 246-256 illustrated is repeated for each path, each path having multiple associated suitability metrics.

Figure 7:
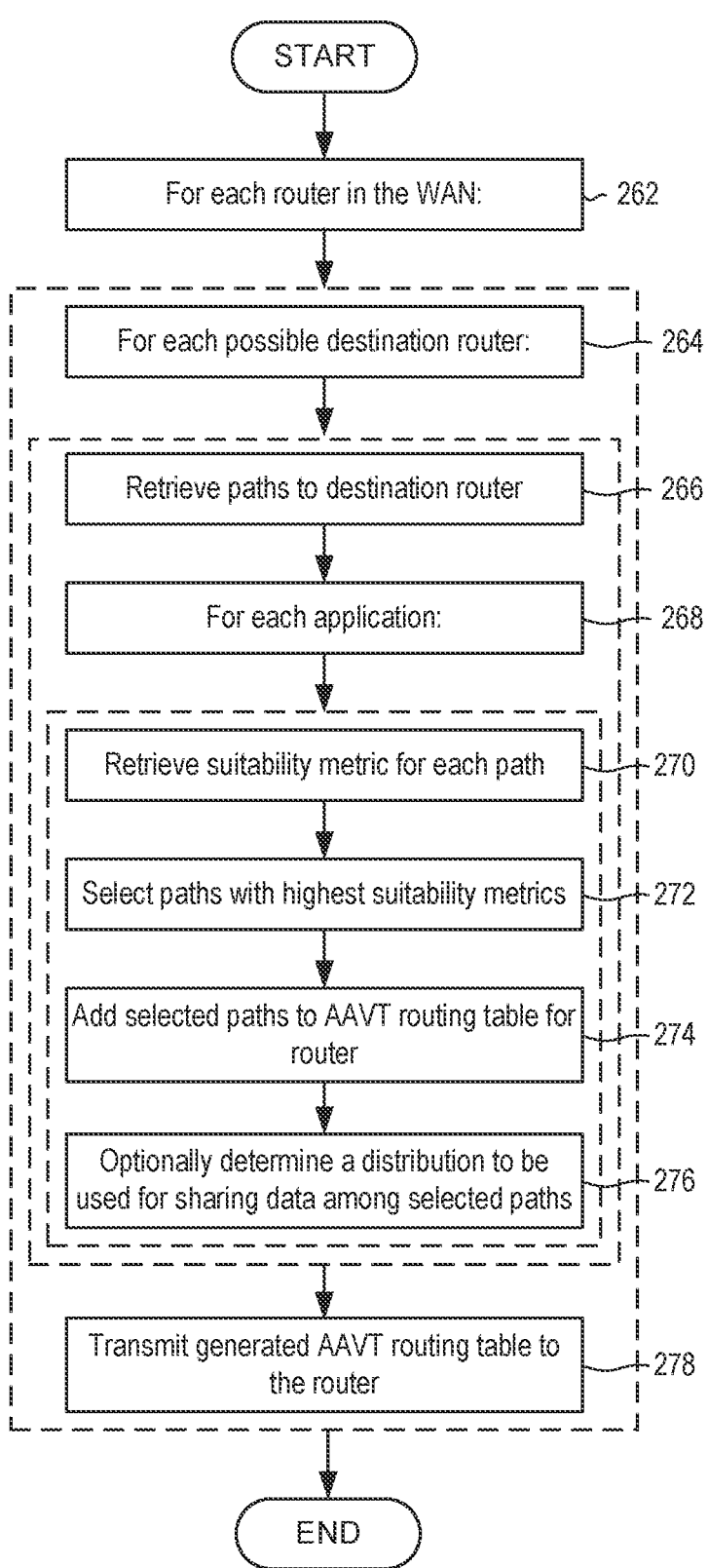
FIG. 7 shows a flowchart illustrating a method in which a network controller generates an application-aware virtual topology (AAVT) routing table for each of a set of network devices in accordance with one or more disclosed embodiments.

Referring to FIG. 7, a flowchart is shown to illustrate a method in which the network controller generates an AAVT routing table for each of the network devices (e.g., the branch network devices (111A, 111N), the hub network devices (113A, 113N)) connected to the network. It should be noted that some of the steps in the depicted method are nested to illustrate that these steps are taken as a group in an iterative fashion. For example, steps 270-276 are performed once for each application (data type) that may be transmitted by the router. Similarly, steps 266-276 are performed once for each possible destination router to which data may be transmitted from the router for which the AAVT table is currently being generated. Also, like other methods disclosed herein, the steps of the method may be modified, performed in a different order, combined, performed in a parallel and/or partially overlapping manner without departing from the disclosure.

In step 262, a particular router is selected and considered for generation of a corresponding AAVT routing table. Since the router is being considered to generate an AAVT routing table with selected paths from this router to all of the possible destination routers in the WAN, this router may be referred to as the source router. When the router has been identified steps 264-278 are performed for the router. When these steps have been completed, the next router is selected, and the same steps are repeated for that router. This is repeated for each of the routers in the WAN.

In step 264, all of the possible destination routers to which the source router may transmit data are identified and considered in turn. For each of the possible destination routers, steps 266-276 are performed.

In step 266, the network controller accesses the underlay graph that it previously obtained to represent the topology of the WAN in order to determine the paths that the source router may use to transmit data to a selected destination router. In step 268, the network controller considers each of the applications (data types) that the source router may transmit to the selected destination router. For each of these applications, the network controller performs steps 270-276.

In step 270, the network controller retrieves the suitability metric for each path between the source router and the destination router. In step 272, the network controller compares the suitability metrics for the specific application being considered and selects the one or more paths that have the highest suitability metrics for the application. The number of paths that are selected is configurable. For example, the network controller may select the N paths having the highest suitability metrics, where N is configurable and may be as low as 1, and may be higher as allowed by practical considerations, (e.g., the amount of memory required to store a greater number of paths, the amount of computational resources required to identify a greater number of paths, etc.) In step 274, the network controller adds the selected paths to the AAVT routing table for the source router. The selected paths are associated in the AAVT routing table with the specific destination router and the specific application.

In step 276, the network controller may optionally determine a distribution to be used with the selected paths. If a distribution is specified, the source router will, when transmitting data for a specific application to a specific destination router, determine the distribution specified for the application/destination router combination, and will distribute data for the application between the associated paths according to the distribution. For example, if the distribution indicates a 60%/40% distribution between first and second paths, the source router will transmit 60% of its data traffic for the application via the first path and 40% via the second path. If no distribution is indicated, the source router can select a single path and use only that path to transmit data for the application, or it can select multiple paths from those listed in the AAVT routing table for the corresponding destination router and application and make its own determination as to the distribution of data traffic over the selected paths.

In Step 278, the network controller transmits the AAVT routing tables to each of the respective network devices connected to the network. In one or more embodiments, the network controller may transmit the AAVT routing tables through the route reflector.

In one or more embodiments, the network controller may also transmit instructions for each network device to program all of the paths included in each of the respective AAVT routing tables. The paths to be programmed in each network device may depend on the network device information and policies. For example, assume that a network device includes network device information and policies specifying that all network traffic must pass through a firewall service within the network. All single virtual-hop and multiple virtual-hop paths in the AAVT routing table that do not traverse the firewall service will not be programmed into the network device. As another example, assume that the network is an enterprise network and the enterprise network is configured such that inter-region network traffic can only be received and transmitted through the hub network device. Said another way, a branch network device A of one region can only send network traffic to a branch network device B of another region by going through the hub network devices of the two regions. For communications between branch network device A and branch network device B, only paths that go through the hub network devices will be programmed in branch network devices A and B.

In one or more embodiments, the network controller may program a network device (through the instructions sent with the AAVT routing table) using, for example, a stack of paths (e.g., virtual paths representing a connection using a virtual tunnel link between two network devices) representing a trajectory of the packet through the network to optimize the path(s) utilized by the network device for specific network traffic. Other methods of programming a network device to use the paths included in the AAVT routing tables may also be used without departing from the scope of this disclosure.

To further clarify embodiments of the disclosure, an example is provided in FIGS. 8-9 to illustrate the collection of information, generation of AAVT routing tables and transmission of the AAVT routing tables to the network devices. The numbers in the brackets below, e.g., "[1]", correspond to the same circled numbers in FIGS. 8-9.

Initially, assume that a WAN has a domain (300) with a topology shown in FIG. 8. Further assume that the domain (300) is configured to include a single network controller (301) that is in charge of generating an AAVT for each of the network devices in the domain (300).

To generate an AAVT for each network device in domain (300), hub network device A (307A) and hub network device B (307B) receive path information from branch network devices (309A-309D) of their respective regions (i.e., region A (305A) and region B (305B) and aggregates the path information into aggregated path information databases [1]. The aggregated path information databases are transmitted to the network controller (301) [2]. The aggregated path information databases are received by the route reflector (302) and transmitted to the route identifier agent (303) [3]. The route identifier agent (303) includes a path computation engine that uses the aggregated path information databases to generate an AAVT routing table for each of the branch network devices (309A-309D) and each of the hub network devices (307A and 307B) [4].

Turning now to FIG. 9, after the AAVT routing tables are generated, the route identifier agent (303) provides the AAVT routing tables to the route reflector (302) [5]. The route reflector (302) receives the AAVT routing tables from the route identifier agent (303) [6]. The route reflector (302) transmits (or otherwise provides) the AAVT routing tables to each of the branch network devices (309A-309D) and each of the hub network devices (307A and 307B) [7]. Upon receiving the AAVT routing tables, each of the branch network devices (309A-309D) and each of the hub network devices (307A and 307B) programs paths identified in their respective AAVT routing tables [8].

Figure 10:
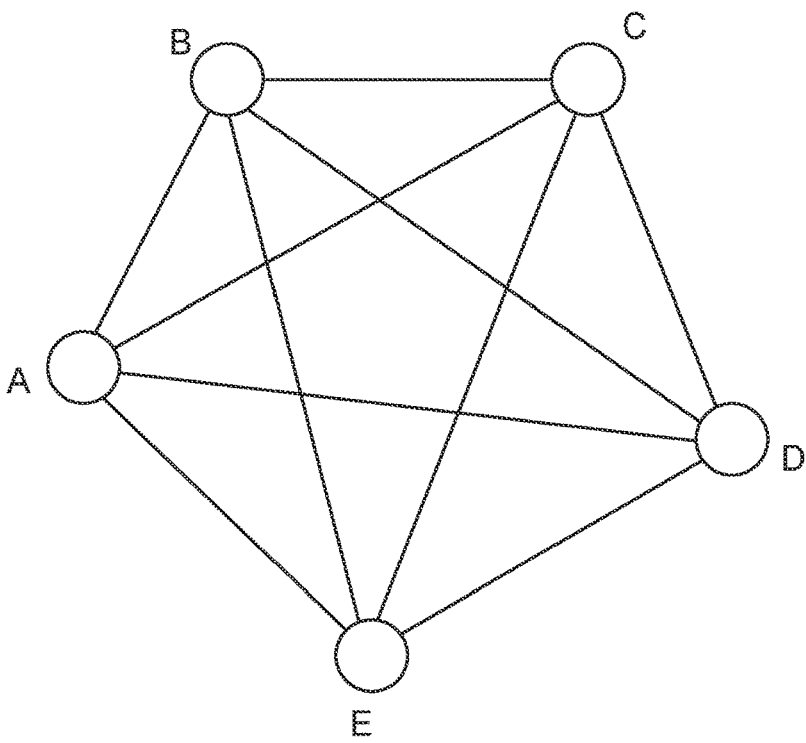
FIG. 10 shows a diagram illustrating an example topology for the computation of suitability metrics and selection of routing paths for an AAVT routing table in accordance with one or more disclosed embodiments.

Referring to FIG. 10, a diagram is provided to illustrate an example topology for the computation of suitability metrics and selection of routing paths for an AAVT routing table. In this example, a very simple WAN topology having only five routers (A-E) is considered. Each of the routers is connected directly to each of the other routers (e.g., A is connected directly to B, A is connected directly to C, etc.) Each of the routers is also connected indirectly to the other routers through intermediate ones of the routers (e.g., A is connected indirectly to B through C, A is connected indirectly to B through D, etc.) The routers may further be indirectly connected through more than two hops, but these will not be explicitly considered in this example for the sake of simplicity.

For the purposes of this example, router A will be considered the source router, and router C will be considered the destination router. Routers B, D and E are potential intermediate routers between router A and router C. Referring to Table 1 below, there is a single one hop path (A-C) and there are three two-hop paths (A-B-C, A-D-C, A-E-C). As noted above, there may also be paths that include more than two hops (e.g., A-B-D-C, A-B-E-C, etc.)

TABLE 1

| path | Application 1 | Application 2 | . . . | Application N |
|------|---------------|---------------|-------|---------------|
| A-C | $S_{11}$ | $S_{21}$ | | $S_{N1}$ |
| A-B-C | $S_{12}$ | $S_{22}$ | | $S_{N2}$ |
| A-D-C | $S_{13}$ | $S_{23}$ | | $S_{N3}$ |
| A-E-C | $S_{14}$ | $S_{24}$ | | $S_{N4}$ |

Table 1 shows each of the paths from source router A to destination router C. Each row in the table identifies the path and a set of suitability metrics. The suitability metric is represented by Sij, where i corresponds to the $i^{th}$ application, and j corresponds to the $j^{th}$ path. There is a suitability metric for each application for which router A may transmit data to router C. The suitability metric for each application is computed using a corresponding algorithm. The algorithms corresponding to each of the applications may be different, so the resulting suitability metrics for a given path may be different for each application. In other words, the suitability of the path for one application may be different than its suitability for a different application.

Table 1 shows the results of the suitability metric computations—it is not the AAVT routing table. The suitability metrics in Table 1 are used to select some of the paths that will be added to the AAVT routing table. As noted above, the AAVT routing table is specific to the source router—in this case, router A. for each possible destination router, the AAVT routing table identifies one or more paths for each application that have the highest suitability. Table 1 contains suitability metrics for destination router C, so it is used to select the paths only from Router A to router C. Similar tables (or other data structures) containing suitability metrics for other destination routers (B, D, E) are generated and used to select paths from router A to those respective destination routers.

Referring again to Table 1, in order to select the paths through which data for application 1 will be transmitted to router C, the suitability metrics for application 1 for each of the paths is considered. In this example, assume that the suitability metrics for the paths are ranked S11>S13>S14>S12. If only a single path is to be selected, direct path A-C has the highest suitability metric (S11), so it would be selected. If two paths are to be selected, the two highest suitability metrics correspond to paths A-C and A-D-C, so these two paths would be selected. In either case, the selected paths are included in the AAVT routing table for router A. More specifically, these paths are selected as the paths for transmission of data for application 1 from router A to router C. The suitability metrics for of the other applications will be examined in the same manner to select the most suitable path(s) for transmission of data for each of these applications from router A to router C. These paths would also be added to the AAVT routing table for router A.

If multiple paths are selected to be included in the AAVT routing table for transmission of data for the application, a distribution for data traffic on the selected paths may also be specified. In one embodiment, the distribution could be proportional to the respective suitability metrics. In other embodiments, other distributions could be specified.

As noted above, the suitability metrics of Table 1 are used only to determine the suitability of paths from router A (the source router) to router C (the destination router). The AAVT routing table for router A will also include paths for transmitting data from router A to routers B, D and E, so tables similar to Table 1 (or other data structures to store suitability metrics) will have to be created for each of the destination routers, and paths for each application will have to be selected for transmission of the corresponding types of data from router A to the respective destination routers.

It can be seen that as the number of routers in the network increases, the complexity of the possible paths between each pair of routers also increases. In fact, the complexity of the paths, and the number of possible paths between the routers increases far more rapidly—with order O(n!). Thus, for 10 routers, there are approximately $3.6 \times 10^6$ paths, for 20 routers, there are approximately $2.4 \times 10^{18}$ paths, and for 30 routers, there are approximately $2.6 \times 10^{32}$ paths.

Because it would be impractical to have to consider all of these paths, some embodiments may use algorithms to limit the number of paths that are considered for each pair of routers. In some embodiments, the controller may consider only paths that contain no more than a predetermined number of hops. In other embodiments, an algorithm such as the Dijkstra algorithm (which finds the shortest paths between nodes in a weighted graph) may be used to determine a predetermined number of shortest paths. In some embodiments, the controller may, for each pair of routers, find the shortest path between the routers, then eliminate one of the links from the shortest path and find a new shortest path without the eliminated link. This may be repeated multiple iterations, where for each iteration, a different link of the shortest path is eliminated and a corresponding new shortest path is determined.

A Pareto breadth-first search (BFS) algorithm may be used to select the paths to be considered for each pair of routers, and improvements to the Pareto BFS algorithm to increase diversity of paths.

Pareto BFS starts with a root node and explores all its adjacencies. For each node, a Pareto set containing currently found Pareto optimal paths from the root node to this node is stored. In each iteration, a path a path is considered that is still present in the Pareto set. By exploring the last node's adjacencies, this path is extended and compared with all paths stored in the Pareto set for the new destination. According to the Pareto comparison result, a new Pareto set may be created for this new destination. After visiting all paths in Pareto sets, Pareto optimal paths from the root to every other node are found.

Exploring only the paths in Pareto sets significantly reduces the computation complexity of Pareto BFS. However, in a sparse network, Pareto BFS may not be able to find enough paths to be used for load balancing. In this case, suboptimal paths are considered. The above Pareto BFS is enhanced by having a separate queue for storing suboptimal paths that are encountered during the search. After exploring all Pareto optimal paths, each suboptimal path is dequeued and added to the corresponding Pareto set if that Pareto set has fewer paths than desired.

In some embodiments, the improved algorithm may include the following steps:

1. There is still a single paretoSet for each destination node.
2. Perform the regular BFS with constraints operation that radially explores the graph outwards one adjacency at a time.
3. As before, during the BFS walk, when a path is deemed as pareto-optimal with respect to other paths to that destination, it is added to the paretoSet for that destination node.
4. The path that is added to the paretoSet is also added to a BFS walk queue (pathQueue). This is the queue used for the BFS implementation.
5. The improved algorithm also uses another queue called subPathQueue.
6. Paths are added to the subPathQueue when they are not pareto-optimal in the previous step (step 3).
7. When all the paths in the pathQueue have been exhausted (which means the pareto BFS walk has terminated), the algorithm then proceeds to drain the subPathQueue.
8. For each path in the subPathQueue:
   a. Check if destination paretoSet already has >=minPathsInParetoSet
   b. If yes, drop the path
   c. Else, add the path to paretoSet and explore further adjacencies from this path.
   d. If exploring further, for each adjacency for this path:
      i. check if the children path's nodes have <=minPathsInParetoSet.
      ii. If yes, add to subPathQueue
      iii. Else, drop the adjacency and continue.

The value for minPathsInParetoSet to achieve maximum diversity may be determined as follows. If a full mesh graph with "p" path-groups (i.e., "p" links interconnecting the nodes in the graph, each belonging to a different path-group) is considered, then ideally it would be desirable to reach one node from another over the following multi-hop paths:

$$minPathsInParetoSet =$$

$$m \times (1 + p + pC2 + pC3 + \ldots + pCp - 1) = m \times (2^\wedge p)$$

where:

m is some multiple (Ex: 4)

$1 \rightarrow 1$ pareto-optimal path with links of all the path-groups $p \rightarrow 1$ path each with links that has only the same path-group$\times$p path-groups $pC2 \rightarrow$ Number of paths with only 2 out of the p path-groups:

$pCp-1 \rightarrow$ Number of paths with only $p-1$ out of p path-groups

The multiple m will ensure that there is more than 1 choice for each combination of path-groups above. This will ensure that there are a diversity of neighboring routers through which paths are chosen. This has the maximum chance of finding paths that satisfy different AAVT constraints, while maintaining diversity.

"Path-group" is used here to refer to a categorization for individual hops (tunnels) in a multi-hop path. A path-group represents a unique underlay network (physical network infrastructure) through which the tunnel is established. For example, a tunnel belongs to the INTERNET path-group if it goes over the INTERNET. The tunnel could belong to the Acme path-group if it primarily uses the Acme network. So the number of path-groups is determined by the number of underlay networks available.

Figure 11:
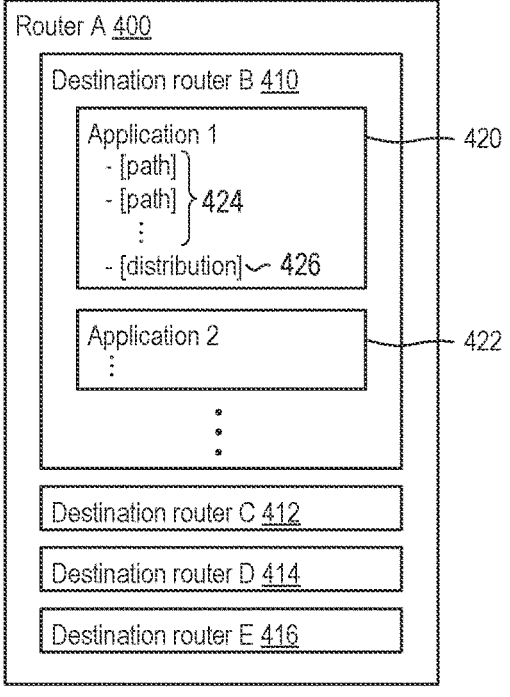
FIG. 11 shows a diagram illustrating the content of an AAVT routing table in accordance with some embodiments.

Referring to FIG. 11, a diagram is shown to illustrate the content of the AAVT routing table in accordance with some embodiments. AAVT routing table 400 contains routing information that is specifically for use by router A. As depicted here, AAVT routing table 400 contains sets of path information corresponding to destination router B (410), destination router C (412), destination router D (414), and destination router E (416). Although not shown explicitly in the figure, the information for each destination router includes the same types of information as shown for destination router B.

Within the path information corresponding to each destination router, there is a set of path information corresponding to each application (e.g., information 420 corresponds to application 1, information 422 corresponds to application 2, etc.) The information corresponding to each application includes a set of paths that are most suitable for transmitting data of the application's type and, optionally, the distribution of traffic across the indicated paths. For instance, the information for application 1 includes paths 424 and traffic distribution 426. The information sets for other applications include similar information.

As discussed above, embodiments disclosed herein may be implemented using computing devices. FIG. 5 shows a diagram of a computing device in accordance with one or more embodiments disclosed herein. Computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, computer processor(s) (502) may be an integrated circuit for processing instructions. For example, the computer processor(s) may be one or more cores or micro-cores of a processor. Computing device (500) may also include one or more input devices (510), such as a touchscreen, keyboard, mouse, microphone, touchpad, electronic pen, or any other type of input device. Further, communication interface (512) may include an integrated circuit for connecting computing device (500) to a network (not shown) (e.g., a local area network (LAN), a wide area network (WAN) such as the Internet, mobile network, or any other type of network) and/or to another device, such as another computing device.

In one embodiment disclosed herein, computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (502), non-persistent storage (504), and persistent storage (506). Many different types of computing devices exist, and the aforementioned input and output device(s) may take other forms.

As shown above, specific embodiments have been described with reference to the accompanying figures. Numerous additional embodiments are also possible. For example, one embodiment comprises an apparatus that includes a centralized controller for a network. The centralized controller is adapted to receive link metrics for a plurality of links between routers in a WAN. For each pair of routers, the centralized controller determines the paths between the router pair, determines suitability metrics for each path, wherein each metric is specific to a corresponding data type, and selects, for each data type, a corresponding subset of the paths between the router pair based at least in part on the suitability metrics for the data type. The centralized controller then transmits, to each of the routers in the WAN, the selected subsets of the paths for the corresponding router.

In some embodiments, the centralized controller stores the selected subsets of the paths corresponding to each router in a routing table for the router, where transmitting the selected subsets of the paths corresponding to the router comprises transmitting the routing table to the router. In some embodiments, for each data type, selecting the subset of paths between the router pair comprises selecting no more than a predetermined, configurable number of the paths based on a ranking of the suitability metrics for each of the paths. In some embodiments, the centralized controller identifies a traffic distribution corresponding to each subset of paths, where the traffic distribution defines amounts of traffic to be distributed to each of the paths.

In some embodiments, the centralized controller is configured to periodically recompute the suitability metrics for the paths, reselect the subsets of paths, and transmit the selected subsets of the paths to each of the plurality of routers in the WAN. The interval at which the centralized controller recomputes the suitability metrics for the paths is variable, and the interval may be determined based on a time required to recompute the suitability metrics for the paths.

In some embodiments, the centralized controller is configured to transmit to each of the routers in the WAN only the subsets of paths specific to that particular router. The centralized controller may be configured to transmit the selected subsets of the paths to each of the routers in the WAN using BGP.

An alternative embodiment comprises a method for generating a routing table for a router in a network. In this method, an underlay graph for a network is obtained and a set of possible destination routers for a first source router is determined based on the underlay graph. For each of the destination routers, a corresponding set of paths from the first source router to the destination router is determined and, for each path in the set of paths, one or more application-specific suitability metrics is computed. For each of a set of applications, one or more of the paths having the highest suitability metrics for the application are selected based on the suitability metrics. The selected application-specific, destination-router-specific paths are then added to a first routing table for the first source router and the first routing table is transmitted to the first source router.

In some embodiments, the method may further comprise the source router transmitting data traffic to each of the destination routers in accordance with the routing table. Transmitting the data traffic may comprise identifying the data traffic to be transmitted, identifying a destination router for the data traffic, identifying an application of the data traffic, identifying in the routing table one or more paths specific to the identified destination router and identified application, and transmitting the data traffic to the destination router via the identified paths specific to the identified destination router and identified application. The method may also include identifying in the routing table a traffic distribution for the identified paths specific to the identified destination router and identified application and transmitting the data traffic via the paths according to the distribution.

In some embodiments, obtaining the underlay graph for the network may comprise receiving information from devices in the network to identify all routers in the network and all paths connecting the routers in the network, and generating the underlay graph. The information identifying all routers in the network and all paths connecting the routers in the network may comprise BGP communications from the routers in the network.

In some embodiments, selecting the paths having the highest suitability metrics for the application comprises selecting N paths, wherein N is a user configurable number. The method may further comprise periodically recomputing the application-specific suitability metrics.

Another alternative embodiment comprises an apparatus including a centralized controller for a network. The centralized controller is adapted to determine a set of possible destination routers for a source router based on the underlay graph. For each of the destination routers, the centralized controller determines a corresponding set of paths from the source router to the destination router and computes, for each path, one or more application-specific suitability metrics. For each of a set of applications, the paths having the highest suitability metrics for the application are selected based on the suitability metrics and the selected application-specific, destination-router-specific paths are added to a routing table for the source router. The routing table is then transmitted to the source router.

In some embodiments, the centralized controller is adapted to obtain an underlay graph for the network, while in other embodiments the centralized controller is adapted to generate an underlay graph for the network based on network device and link information received from network devices in the network. In some embodiments, the centralized controller is adapted to generate a traffic distribution among the selected application-specific, destination-router-specific paths and add the traffic distribution to the routing table for the source router.

It will be understood by those skilled in the art, and having the benefit of this detailed description, that one or more embodiments described herein may be practiced without the specific details provided above, and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired and/or wireless directly between two devices or components) or indirect (e.g., wired and/or wireless connections between any number of devices or components connecting the connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth.

What is claimed is:

1. An apparatus comprising:
a centralized controller for a network, the centralized controller adapted to:

receive, from a plurality of routers in a wide area network (WAN), link metrics for a plurality of links between the plurality of routers;

determine a set of router pairs in the plurality of routers, wherein the set of router pairs comprises permutations of pairs of routers in the plurality of routers;

for each router pair in the set of router pairs:

determine a plurality of paths between routers of that router pair;

determine suitability metrics for each path of the plurality of paths for that router pair, wherein each suitability metric is specific to a corresponding data type and path, and the suitability metric was determined based on measurement of data traversing that path between the routers of that router pair; and select, for each data type, a corresponding subset of the plurality of paths between the router pair based at least in part on the suitability metrics for the data type; and transmit, to each of the plurality of routers in the WAN, the selected subsets of the paths corresponding to the router, wherein the centralized controller is configured to recompute the suitability metrics for the paths at a determined interval, reselect the subsets of paths, and retransmit the selected subsets of the paths to each of the plurality of routers in the WAN.

2. The apparatus of claim 1, wherein the centralized controller stores the selected subsets of the paths corresponding to each router in a routing table for the router, wherein transmitting the selected subsets of the paths corresponding to the router comprises transmitting the routing table to the router.

3. The apparatus of claim 1, wherein, for each data type, selecting the subset of paths between the router pair comprises selecting no more than a predetermined number of the paths based on a ranking of the suitability metrics corresponding to each of the paths between the router pair.

4. The apparatus of claim 1, wherein the centralized controller identifies, for each subset of paths, a corresponding traffic distribution, wherein the traffic distribution defines amounts of traffic to be distributed to each of the paths in the subset of paths.

5. The apparatus of claim 1, wherein an interval at which the centralized controller recomputes the suitability metrics for the paths is variable, and wherein the interval is determined based on a time required to recompute the suitability metrics for the paths.

6. The apparatus of claim 1, wherein the centralized controller is configured to transmit to each of the plurality of routers in the WAN only the subsets of paths specific to the router.

7. A method, comprising:
receiving, from a plurality of routers in a wide area network (WAN), link metrics for a plurality of links between the plurality of routers;

determining a set of router pairs in the plurality of routers, wherein the set of router pairs comprises permutations of pairs of routers in the plurality of routers;

for each router pair in the plurality of routers:

determining a plurality of paths between the router pair;

determining suitability metrics for each path of the plurality of paths for that router pair, wherein each suitability metric is specific to a corresponding data type and path, and the suitability metric was determined based on measurement of data traversing that path between the routers of that router pair;

selecting, for each data type, a corresponding subset of the plurality of paths between the router pair based at least in part on the suitability metrics for the data type; and transmitting, to each of the plurality of routers in the WAN, the selected subsets of the paths corresponding to the router, wherein the centralized controller is configured to recompute the suitability metrics for the paths at a determined interval, reselect the subsets of paths, and retransmit the selected subsets of the paths to each of the plurality of routers in the WAN.

8. The method of claim 7, further comprising storing the selected subsets of the paths corresponding to each router in a routing table for the router, wherein transmitting the selected subsets of the paths corresponding to the router comprises transmitting the routing table to the router.

9. The method of claim 7, wherein, for each data type, selecting the subset of paths between the router pair comprises selecting no more than a predetermined number of the paths based on a ranking of the suitability metrics corresponding to each of the paths between the router pair.

10. The method of claim 7, further comprising identifying, for each subset of paths, a corresponding traffic distribution, wherein the traffic distribution defines amounts of traffic to be distributed to each of the paths in the subset of paths.

11. The method of claim 7, wherein an interval at which the suitability metrics for the paths are recomputed is variable, and wherein the interval is determined based on a time required to recompute the suitability metrics for the paths.

12. The method of claim 7, further comprising transmitting to each of the plurality of routers in the WAN only the subsets of paths specific to the router.

13. A non-transitory computer readable medium, comprising instructions for:

receiving, from a plurality of routers in a wide area network (WAN), link metrics for a plurality of links between the plurality of routers;

determining a set of router pairs in the plurality of routers, wherein the set of router pairs comprises permutations of pairs of routers in the plurality of routers;

for each router pair in the plurality of routers:

determining a plurality of paths between the router pair;

determining suitability metrics for each path of the plurality of paths for that router pair, wherein each suitability metric is specific to a corresponding data type and path, and the suitability metric was determined based on measurement of data traversing that path between the routers of that router pair;

selecting, for each data type, a corresponding subset of the plurality of paths between the router pair based at least in part on the suitability metrics for the data type; and transmitting, to each of the plurality of routers in the WAN, the selected subsets of the paths corresponding to the router, wherein the centralized controller is configured to recompute the suitability metrics for the paths at a determined interval, reselect the subsets of paths, and retransmit the selected subsets of the paths to each of the plurality of routers in the WAN.

14. The non-transitory computer readable medium of claim 13, further comprising instructions for storing the selected subsets of the paths corresponding to each router in a routing table for the router, wherein transmitting the selected subsets of the paths corresponding to the router comprises transmitting the routing table to the router.

15. The non-transitory computer readable medium of claim 13, wherein, for each data type, selecting the subset of paths between the router pair comprises selecting no more than a predetermined number of the paths based on a ranking of the suitability metrics corresponding to each of the paths between the router pair.

16. The non-transitory computer readable medium of claim 13, further comprising instructions for identifying, for each subset of paths, a corresponding traffic distribution, wherein the traffic distribution defines amounts of traffic to be distributed to each of the paths in the subset of paths.

17. The non-transitory computer readable medium of claim 13, wherein an interval at which the suitability metrics for the paths are recomputed is variable, and wherein the interval is determined based on a time required to recompute the suitability metrics for the paths.

* * * * *